Feb. 25, 1930.  J. W. H. RANDALL  1,748,079
LAMINATED GLASS AND PROCESS OF PRODUCING THE SAME
Filed Nov. 17, 1927
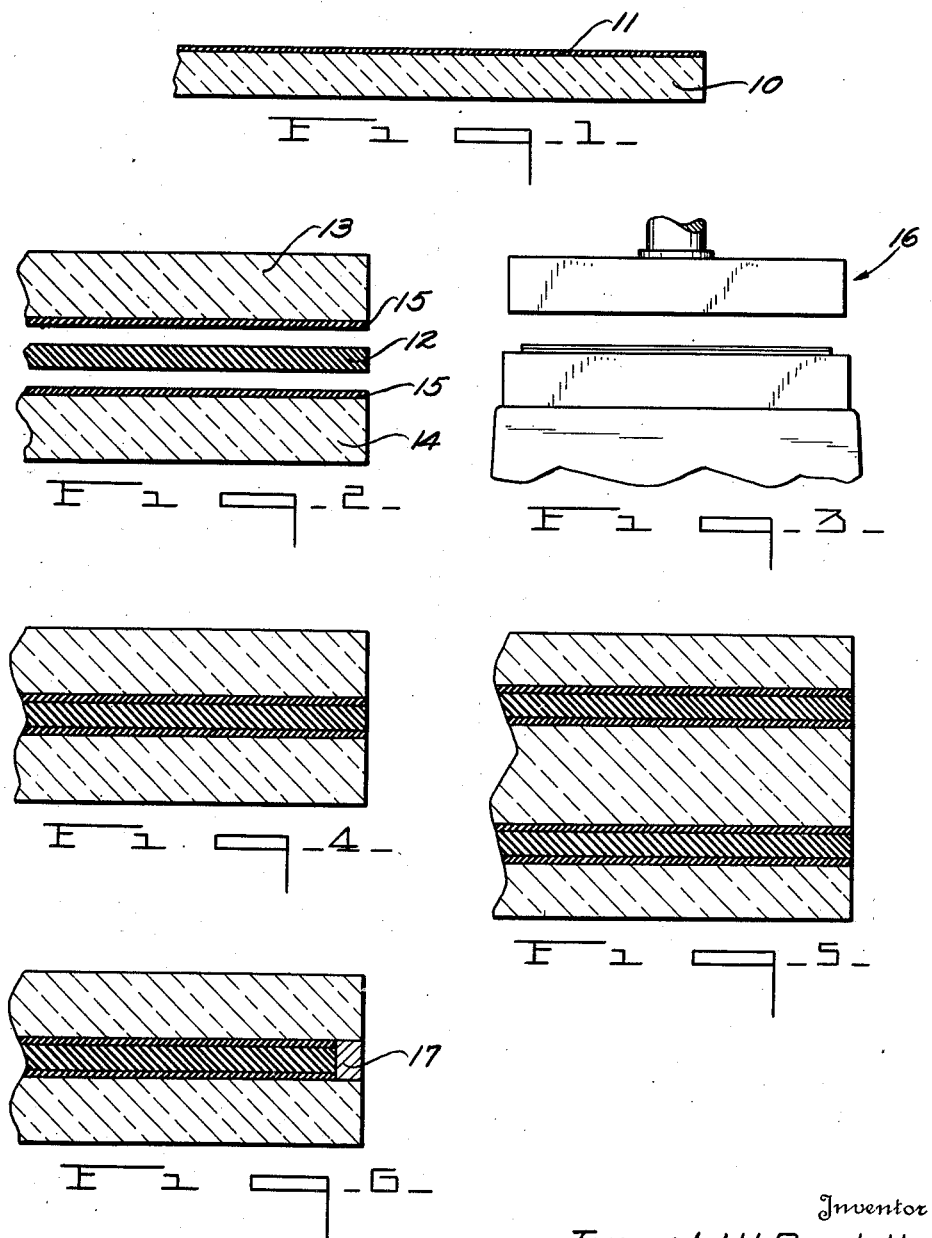
Inventor
James W. H. Randall
By Frank Fraser
Attorney Patented Feb. 25, 1930

1,748,079

UNITED STATES PATENT OFFICE

JAMES W. H. RANDALL, OF NEW YORK, N. Y., ASSIGNOR TO LIBBEY-OWENS GLASS COMPANY, OF TOLEDO, OHIO, A CORPORATION OF OHIO

LAMINATED GLASS AND PROCESS OF PRODUCING THE SAME

Application filed November 17, 1927. Serial No. 233,830.

The present invention relates to laminated glass and to the process of producing the same.

In important object of the invention is to produce a sheet of laminated glass including a sheet of rubber material.

Another object of the invention is to produce a sheet of laminated glass including a sheet of cured, transparent rubber.

Another object of the invention is to produce a sheet of laminated glass including a plurality of sheets of glass and a sheet of rubber, the three being united by means of a rubber cement.

Still another object of the invention is to provide a sheet of laminated glass and process for producing the same wherein a sheet of preferably cured, colorless, transparent rubber is interposed between two sheets of preferably transparent glass and united thereto by means of a transparent uncured rubber cement.

Other objects and advantages of the invention will become more apparent during the course of the following description when taken in connection with the accompanying drawings.

In the drawings wherein like numerals are employed to designate like parts throughout the same, Fig. 1 is a fragmentary sectional view illustrating a sheet of glass having a film of rubber cement thereon, Fig. 2 is a fragmentary sectional view illustrating a sheet of rubber interposed between two sheets of glass, each having a film of rubber cement thereon, Fig. 3 is a diagrammatic representation of a press which may be used to unite the laminations, Fig. 4 represents one form of finished sheet, Fig. 5 represents another form of finished product, and Fig. 6 illustrates the use of luting.

Referring to the drawings, the numeral 10 designates a sheet of glass whose surfaces may be ground and polished, or not, as desired. Arranged on the sheet of glass is a film of cement 11 which is preferably a transparent and colorless rubber cement.

In Fig. 2, the numeral 12 designates a sheet of rubber material and is preferably cured or vulcanized, substantially colorless and transparent. The rubber sheet 12 is interposed between the sheets of glass 13 and 14, each of which is provided with a coating or film of cement 15. The cement 15 is preferably a rubber cement formed from uncured or raw rubber which is not vulcanized. The cement may be formed from bleaching or purifying crepe rubber and then dissolving the same in a solvent such as benzol, naptha, or the like. To prevent the introduction of dirt in the laminated sheet, the cement is preferably filtered before being used.

The cement may either be applied directly to the rubber sheet or to the surfaces of the sheets of glass 13 and 14 such as illustrated in Fig. 2, and I prefer that the cement be applied to the glass sheets, although of course it may be applied to either or both. The coating or coatings of rubber cement are preferably allowed to dry substantially free from solvent, before the laminations are united, and this drying may be allowed to take place at room temperatures or the sheets may be placed in a temperature controlled oven or room and there subjected to temperatures ranging from approximately 150° Fahrenheit to 160° Fahrenheit. After the cement has been applied to the laminations and they are positioned in superposed relation, they are arranged in the press 16 and united. The sandwich, when being pressed, may, if desired, be subjected to a temperature ranging from 150° F. to 160° F., although the use of heat is not absolutely necessary to the successful operation of my invention.

Fig. 4 represents the finished sheet, although it is not to be understood that the thickness of the various laminations and films are drawn accurately to size as the thickness of the film of cement may be relatively much thinner than that illustrated.

In Fig. 6, the inner portion of the laminated sandwich is protected from the atmosphere by means of a luting material 17 which may be rubber, pitch, or some similar substance capable of preventing exposure of the rubber portion of the sandwich.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass including a sheet of vulcanized rubber.

2. As a new article of manufacture, a sheet of laminated glass including a sheet of transparent cured rubber.

3. As a new article of manufacture, a sheet of laminated glass including a sheet of glass and a sheet of cured rubber united thereto.

4. As a new article of manufacture, a sheet of laminated glass including a sheet of glass and a sheet of cured rubber cemented thereto.

5. As a new article of manufacture, a sheet of laminated glass comprising two sheets of glass and a sheet of transparent cured rubber united therebetween.

6. As a new article of manufacture, a sheet of laminated glass comprising two sheets of glass, a sheet of transparent rubber interposed therebetween, and a rubber binding medium uniting the three sheets.

7. As a new article of manufacture, a sheet of laminated glass comprising two sheets of glass, a sheet of transparent vulcanized rubber interposed therebetween, and non-cured rubber cement uniting the rubber sheet to the two sheets of glass.

8. The process of producing laminated glass consisting in interposing a sheet of rubber between two sheets of glass, and then cementing the three sheets together.

9. The process of producing laminated glass consisting in applying a film of rubber ber between two sheets of glass, and then cementing the three sheets together with a rubber cement.

10. The process of producing laminated glass consisting in interposing a vulcanized, transparent rubber sheet between two sheets of glass, and then cementing the three together with a transparent rubber cement which is not vulcanized.

11. The process of producing laminated glass consisting in applying a film of rubber cement to one side each of two sheets of glass, allowing the films to become substantially dry, then interposing a non-brittle sheet between the rubber cement coated glass surfaces and uniting the same.

12. The process of producing laminated glass consisting in applying a film of rubber cement to one side each of two sheets of glass, allowing the films to become substantially dry, then interposing a rubber sheet between the rubber cement coated glass surfaces and uniting the same.

13. The process of producing laminated glass consisting in applying a film of rubber cement to one side each of two sheets of glass, allowing the films to become substantially dry, then interposing a cured rubber sheet between the rubber cement coated glass surfaces and uniting the same.

Signed at New York, in the county of New York and State of New York, this 5th day of November, 1927.

JAMES W. H. RANDALL.